US010741191B2

(12) United States Patent
Kim et al.

(10) Patent No.: US 10,741,191 B2
(45) Date of Patent: Aug. 11, 2020

(54) VOICE SIGNAL PROCESSING METHOD ACCORDING TO STATE OF ELECTRONIC DEVICE, AND ELECTRONIC DEVICE THEREFOR

(71) Applicant: Samsung Electronics Co., Ltd., Gyeonggi-do (KR)

(72) Inventors: Yang-Su Kim, Gyeonggi-do (KR); Jung-Ae Choi, Gyeonggi-do (KR); Sang-Phil Hong, Gyeonggi-do (KR); Young-Soo Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 117 days.

(21) Appl. No.: 15/778,684

(22) PCT Filed: Nov. 2, 2016

(86) PCT No.: PCT/KR2016/012524
§ 371 (c)(1),
(2) Date: May 24, 2018

(87) PCT Pub. No.: WO2017/090907
PCT Pub. Date: Jun. 1, 2017

(65) Prior Publication Data
US 2018/0350380 A1   Dec. 6, 2018

(30) Foreign Application Priority Data
Nov. 24, 2015   (KR) .................. 10-2015-0165032

(51) Int. Cl.
*G10L 21/02* (2013.01)
*G10L 21/0208* (2013.01)
(Continued)

(52) U.S. Cl.
CPC ........ *G10L 21/0208* (2013.01); *G06F 1/3212* (2013.01); *G06F 1/3234* (2013.01); *G06F 1/3278* (2013.01); *G10L 25/78* (2013.01)

(58) Field of Classification Search
None
See application file for complete search history.

(56) References Cited

U.S. PATENT DOCUMENTS 6,205,217 B1   3/2001   Nobusawa
7,552,050 B2 *  6/2009   Matsumoto ............. G10L 15/20
                                                   379/388.03
(Continued)

FOREIGN PATENT DOCUMENTS

JP        3022807        3/2000
JP      2002359665      12/2002
(Continued)

OTHER PUBLICATIONS

PCT/ISA/210 Search Report issued on PCT/KR2016/012524 (pp. 3).

*Primary Examiner* — Satwant K Singh
(74) *Attorney, Agent, or Firm* — The Farrell Law Firm. P.C.

(57) ABSTRACT

The present invention relates to a voice signal processing method according to a state of an electronic device, and an electronic device therefor. An electronic device according to various embodiments comprises: a microphone; and a processor, wherein the processor can be configured to: obtain a voice signal using the microphone, check a state of the electronic device, and generate a first voice signal by filtering the voice signal using a first method, at least based on a determination of the electronic device being in a first state; generate a second voice signal by filtering the voice signal using a second method, at least based on a determination of the electronic device being in a second state; and transmit to (Continued)

an external electronic device a corresponding voice signal of the first voice signal or the second voice signal. In addition, other embodiments are possible.

11 Claims, 9 Drawing Sheets

(51) Int. Cl.
  *G06F 1/3234* (2019.01)
  *G06F 1/3212* (2019.01)
  *G10L 25/78* (2013.01)

(56) References Cited

U.S. PATENT DOCUMENTS

| | | | |
|---|---|---|---|
| 8,392,004 | B2 | 3/2013 | Matsuda et al. |
| 9,119,159 | B2 * | 8/2015 | Silverstein ............ G06F 1/3212 |
| 9,780,739 | B2 * | 10/2017 | Muench .................... H03F 1/02 |
| 2010/0322438 | A1 * | 12/2010 | Siotis .................... H03G 3/007 |
| | | | 381/98 |
| 2015/0156726 | A1 | 6/2015 | Akkarakaran et al. |
| 2016/0050305 | A1 * | 2/2016 | Lee ..................... H04M 1/6041 |
| | | | 455/563 |

FOREIGN PATENT DOCUMENTS

| | | |
|---|---|---|
| JP | 4209761 | 1/2009 |
| KR | 200306837 | 5/2003 |
| KR | 1020040035465 | 4/2004 |
| KR | 1020060097259 | 9/2006 |
| KR | 1020120036854 | 4/2012 |

* cited by examiner

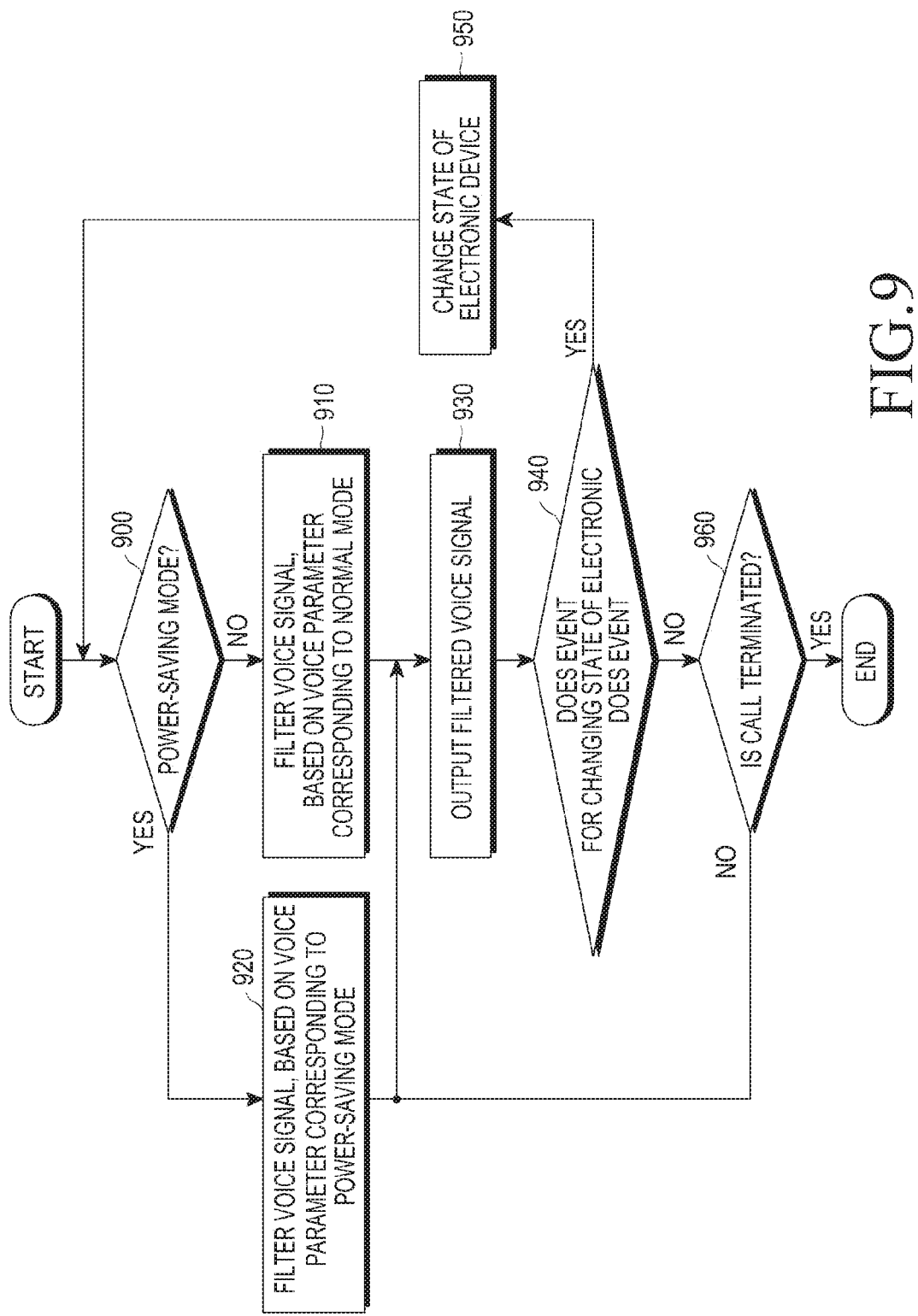

_US 10,741,191 B2_

VOICE SIGNAL PROCESSING METHOD ACCORDING TO STATE OF ELECTRONIC DEVICE, AND ELECTRONIC DEVICE THEREFOR

PRIORITY

This application is a National Phase Entry of International Application No. PCT/KR2016/012524, which was filed on Nov. 2, 2016, and claims priority to Korean Patent Application No. 10-2015-0165032, which was filed on Nov. 24, 2015, the contents of each of which are incorporated herein by reference.

BACKGROUND

1. Field

The present disclosure generally relates to a method of processing a voice signal according to the state of an electronic device.

2. Description of the Related Art

To perform a phone call, generally, an electronic device (e.g., a transmission terminal) receives voice signals of a user received from a microphone, noise, echo, and the like, removes interfering signals, such as the noise, echo, and the like, which are separate from the voice signals and hinder conversation, via a pre-processing scheme, uses a vocoder or a digital codec to encode the signals improved by the pre-processing scheme, and transmits the encoded signals to an external electronic device (e.g., a transmission terminal).

A circuit-switched (CS) call communication scheme used to be used for such phone calls. However, with the continued development of data transmission technologies, calls are enabled via a long-term evolution (LTE) communication network or a Wi-Fi network, which is convenient for users.

SUMMARY

As described above, a conventional electronic device (e.g., a transmission terminal) performs pre-processing in order to remove noise, echo, or the like, which is distinguished from a voice signal of a speaker received from a microphone, encodes a pre-processed signal, and transmits the encoded signal to an external electronic device (e.g., a reception terminal).

In this instance, a vocoder encodes the pre-processed signal using a model of a voice generation system of a human, and thus a large amount of power may be consumed for encoding.

Recently, much attention is being paid to a signal-processing method which limits operation of the vocoder to the minimum level by suppressing unnecessary surrounding noise and unnecessary signal of voice signal.

Therefore, there is a desire for a method of removing signals interfering with voice signals from a transmission terminal, so as to eliminate unnecessary power consumption.

Various embodiments of the present disclosure provide a method for processing a voice signal according to the state of an electronic device, and the electronic device.

To achieve the above description, an electronic device according to various embodiments may include a microphone and a processor, wherein the processor is configured to perform: obtaining a voice signal via the microphone; identifying the state of the electronic device; filtering the voice signal according to a first method based at least on a determination indicating that the electronic device is in a first state, and generate a first voice signal; filtering the voice signal according to a second method based at least on a determination indicating that the electronic device is in a second state, and generate a second voice signal; and transmitting a corresponding voice signal from among the first voice signal and the second voice signal to an external electronic device.

To achieve the above description, a method of filtering a voice signal by an electronic device according to various embodiments of the present disclosure may include: obtaining a voice signal via a microphone; identifying the state of the electronic device; filtering the voice signal according to a first method based at least on a determination indicating that the electronic device is in a first state, and generate a first voice signal; filtering the voice signal according to a second method based at least on a determination indicating that the electronic device is in a second state, and generate a second voice signal; and transmitting, to an external electronic device, a corresponding voice signal from among the first voice signal and the second voice signal.

According to various embodiments of the present disclosure, an electronic device (e.g., a transmission terminal) removes unnecessary signals distinguished from voice signals so as to minimize the operation of a vocoder, whereby current consumption may be improved.

BRIEF DESCRIPTION OF THE DRAWINGS

The above and other aspects, features and advantages of the present disclosure will be more apparent from the following detailed description taken in conjunction with the accompanying drawings, in which:

FIG. 9 is a flowchart illustrating a process of filtering a voice signal, based on a change in the state of an electronic device while a voice call is being performed according to various embodiments.

DETAILED DESCRIPTION

Figure 1:
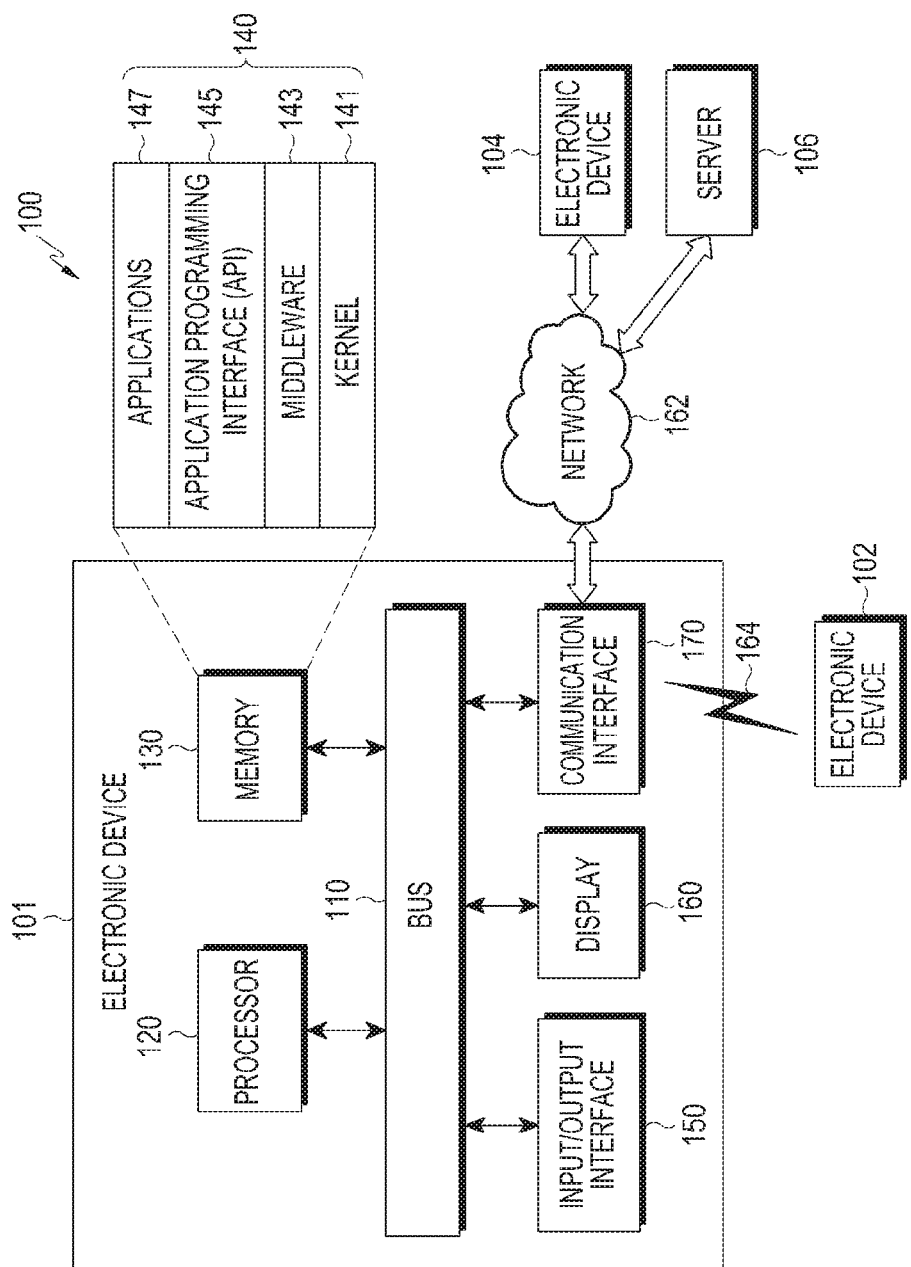
FIG. 1 is a diagram illustrating a network environment including an electronic device, according to various embodiments.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., Central Processing Unit (CPU) or Application Processor (AP)) that can perform the corresponding operations by executing one or more software programs stored in a memory device.

The terms used in the present disclosure are only used to describe specific embodiments, and are not intended to limit the present disclosure. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments of the present disclosure will be described with reference to the accompanying drawings. In the present disclosure, the term "user" may indicate a person using an electronic device or a device (e.g., an artificial intelligence electronic device) using an electronic device.

An electronic device 101 in a network environment 100 according to various embodiments will be described with reference to FIG. 1. The electronic device 101 may include a bus 110, a processor 120, a memory 130, an input/output interface 150, a display 160, and a communication interface 170. According to an embodiment, the electronic device 101 may omit at least one of the above elements, or may further include other elements.

The bus 110 may connect elements 110 to 170, and may include a circuit for transmitting communication (e.g., a control message and/or data) between the elements.

The processor 120 may include one or more of a central processing unit (CPU), an application processor (AP), and a communication processor (CP). The processor 120, for example, may carry out operations or data processing relating to control and/or communication of at least one other element of the electronic device 101. The processor 120 may be referred to as a controller, may include a controller as a part thereof, or may be included in the controller.

The memory 130 may include volatile and/or non-volatile memory. The memory 130, for example, may store commands or data related to at least one other element of the electronic device 101. According to an embodiment, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an operating system (OS).

The kernel 141 may control or manage system resources (e.g., the bus 110, the processor 120, the memory 130, or the like) used for executing an operation or function implemented by other programs (e.g., the middleware 143, the API 145, or the application 147). Furthermore, the kernel 141 may provide an interface via which the middleware 143, the API 145, or the application programs 147 may access the individual elements of the electronic device 101 to control or manage system resources.

The middleware 143 may function as, for example, an intermediary for allowing the API 145 or the application programs 147 to communicate with the kernel 141 to exchange data.

Furthermore, the middleware 143 may process one or more task requests, which are received from the application programs 147, according to priorities thereof. For example, the middleware 143 may assign priorities to use the system resources (e.g., the bus 110, the processor 120, the memory 130, or like) of the electronic device 101 to at least one of the application programs 147. For example, the middleware 143 may perform scheduling or load-balancing on the one or more task requests by processing the one or more task requests according to the priorities assigned to the one or more application programs.

The API 145 is an interface via which the applications 147 control functions provided from the kernel 141 or the middleware 143, and may include, for example, at least one interface or function (e.g., instruction) for file control, window control, image processing, text control, or the like.

The input/output interface 150 may serve as, for example, an interface that may transmit commands or data, input from a user or an external device, to another element(s) of the electronic device 101. Furthermore, the input/output interface 150 may output command or data received from the other element(s) of the electronic device 101 to a user or an external device.

The display 160 may include, for example, a liquid crystal display (LCD), a light-emitting diode (LED) display, an organic light-emitting diode (OLED) display, a micro electro mechanical systems (MEMS) display, or an electronic paper display. The display 160 may display, for example, various types of contents (e.g., text, images, videos, icons, symbols, or the like) for a user. The display 160 may include a touch screen, and may receive, for example, a touch input, a gesture input, a proximity input, or a hovering input using an electronic pen or a user's body part.

The communication interface 170 may establish communication, for example, between the electronic device 101 and an external device (e.g., a first external electronic device 102, a second external electronic device 104, or a server 106). For example, the communication interface 170 may be connected to a network 162 via wireless or wired communication, and may communicate with an external device (e.g. the second external electronic device 104 or the server 106).

The wireless communication may use at least one of, for example, long-term evolution (LTE), LTE-advanced (LTE-A), code division multiple access (CDMA), wideband CDMA (WCDMA), universal mobile telecommunications system (UMTS), WiBro (wireless broadband), global system for mobile communications (GSM), or the like, as a cellular communication protocol. In addition, the wireless communication may include, for example, short-range communication 164. The short-range communication 164 may include at least one of, for example, Wi-Fi, Bluetooth, nearfield communication (NFC), a global navigation satellite system (GNSS), and the like. The GNSS may include, for example, at least one of a global positioning system (GPS), a global navigation satellite system (GLONASS), a BeiDou Navigation satellite system (hereinafter BeiDou), Galileo, and the European global satellite-based navigation system, based on a usage location, a bandwidth, or the like. Hereinafter, in the present document, the term "GPS" may be interchangeably used with the term "GNSS". The wired communication may include, for example, at least one of a universal serial bus (USB), a high-definition multimedia interface (HDMI), recommended standard 232 (RS-232), a plain old telephone service (POTS), or the like. The network 162 may include at least one of communication networks such as a computer network (e.g., a LAN or a WAN), the Internet, and a telephone network.

Each of the first and second external electronic devices 102 and 104 may be of a type the same as or different from that of the electronic device 101.

According to an embodiment, the server 106 may include a group of one or more servers.

According to various embodiments, all or some of the operations executed by the electronic device 101 may be executed by another electronic device, a plurality of electronic devices (e.g., the electronic devices 102 and 104, or the server 106).

According to an embodiment, when the electronic device 101 has to perform a function or a service automatically or in response to a request, the electronic device 101 may request another device (e.g., the electronic device 102 or 104, or the server 106) to perform at least some functions relating thereto, instead of autonomously performing the function or service, or in addition to performing the function or service. Another electronic device (e.g., the electronic devices 102 or 104, or the server 106) may execute the requested functions or the additional functions, and may deliver the result of execution thereof to the electronic device 101. The electronic device 101 may provide the received result as it is, or may additionally process the received result to provide the requested functions or services. To this end, for example, cloud-computing, distributed-computing, or client-server-computing technology may be used.

Figure 2:
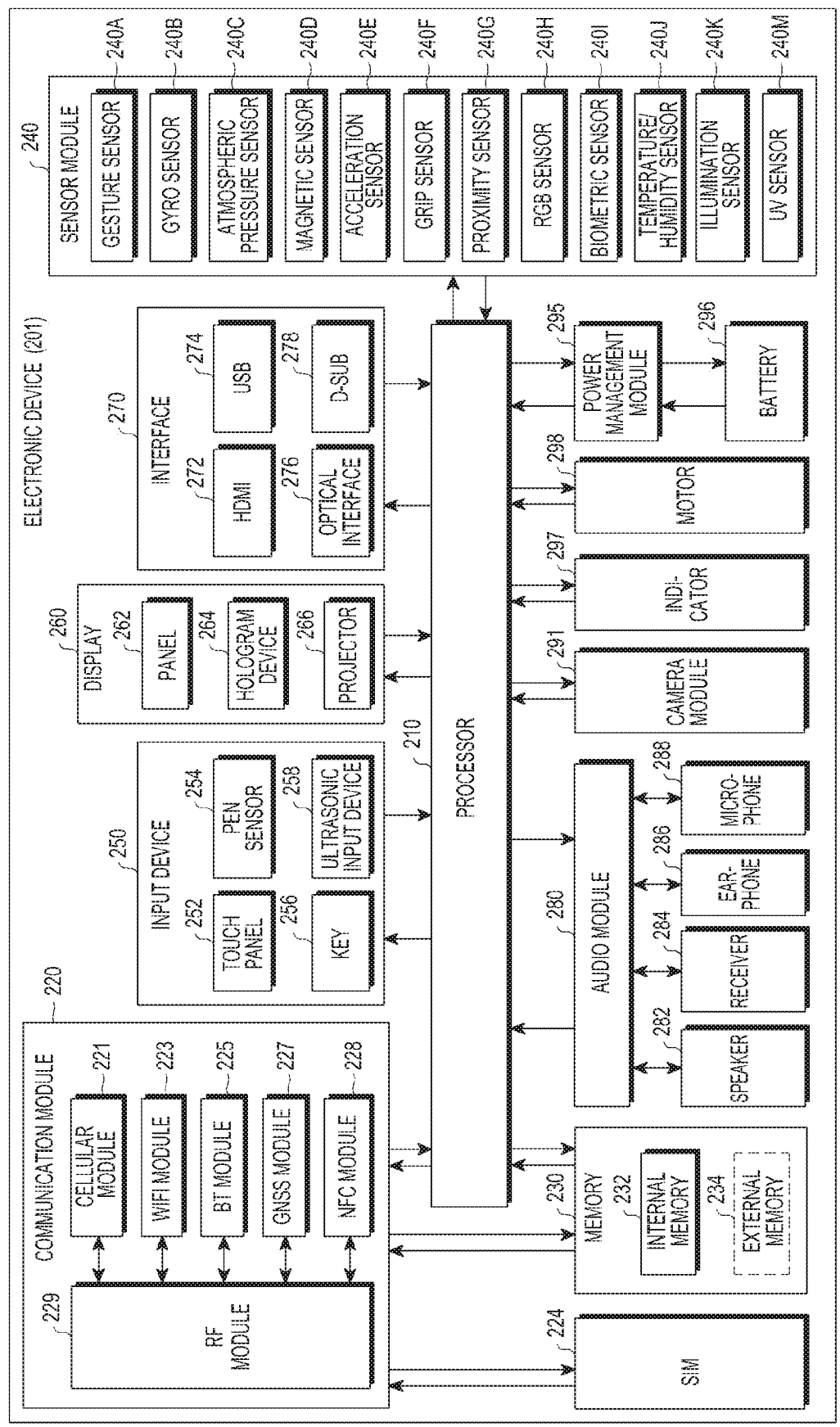
FIG. 2 is a block diagram illustrating an electronic device according to various embodiments.

FIG. 2 is a block diagram illustrating an electronic device according to various embodiments. An electronic device 201 may include, for example, all or part of the electronic device 101 illustrated in FIG. 1. The electronic device 201 may include at least one processor (e.g., an application processor (AP)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control multiple hardware or software elements connected to the processor 210 by running, for example, an Operating System (OS) or an application program, and may process various data and execute operations. The processor 210 may be embodied, for example, as a System on Chip (SoC). The processor 210 may further include a graphic processing unit (GPU) and/or an image signal processor. The processor 210 may include at least some (e.g., a cellular module 221) of the elements illustrated in FIG. 2. The processor 210 may load, into a volatile memory, commands or data received from at least one (e.g., a non-volatile memory) of the other elements, may process the loaded commands or data, and may store various data in a non-volatile memory.

According to an embodiment, the processor 210 obtains a voice signal, identifies the state of the electronic device 201, filters the voice signal according to a first method when the identified state of the electronic device 201 is in a first state, and generate a first voice signal, and filters the voice signal according to a second method when the identified state of the electronic device 201 is a second state, and generate a second voice signal. The processor 210 may transmit a corresponding voice signal from among the first voice signal and the second voice signal to an external electronic device.

The first state may include the case in which the battery capacity of the electronic device 201 falls within a first range, and the second state may include the case in which the battery capacity of the electronic device 201 falls within a second range. The first range and the second range may be predetermined ranges, and may be set so as not to overlap each other. For example, the first state may be the normal mode of the electronic device 201 (e.g., a mode that performs general operation of the electronic device 201), and the second state may be the power-saving mode of the electronic device 201 (e.g., a mode that supplies power to some elements of the electronic device 201 for operation).

The first method or the second method may include a method of setting at least one voice parameter value for a voice signal to be different from each other. The at least one voice parameter may include at least one selected from among the signal strength of a microphone 288, a change in the frequency domain of a voice signal, volume adjustment, noise suppression (NS), echo cancellation (EC), automatic gain control (AGC), filtering, dynamic range compression (DRC), and the like. The above-described voice parameter may be processed in the frequency domain or in the time domain. For example, NS or filter processing may be performed in the frequency domain, and AGC processing may be performed in the time domain. When parameter processing is performed in the frequency domain, the first method may be performed in a first frequency domain, and the second method may be performed in a second frequency domain. In the same manner, when parameter processing is performed in the time domain, the first method may be performed in a first time domain, and the second method may be performed in a second time domain. The first and second frequency domains and the first and second time domains may be set to be the same from or different from each other. The first frequency domain or the second frequency domain may be a narrow band or a broadband.

According to various embodiments, when an event for changing the state of the electronic device 201 occurs, the processor 210 may change the state of the electronic device 201, and may control the audio module 280 such that a voice signal is filtered based on at least one voice parameter corresponding to the changed state and is output via the communication module 220.

The event for changing the state of the electronic device 201 may include both the case in which the electronic device 201 is changed from the first state to the second state and the case in which the electronic device 201 is changed from the second state to the first state.

The communication module 220 may have a configuration identical or similar to that of the communication interface 170 illustrated in FIG. 1. The communication module 220 may include, for example, a cellular module 221, a Wi-Fi module 223, a BT module 225, a GNSS module 227 (e.g., a GPS module, a GLONASS module, a BeiDou module, or a Galileo module), an NFC module 228, and a Radio-Frequency (RF) module 229. According to an embodiment, the communication module 220 may transmit a voice signal to an external electronic device, or may receive a voice signal from an external electronic device.

The cellular module 221 may provide, for example, a voice call, a video call, a text-message service, an Internet service, or the like via a communication network. According to an embodiment, the cellular module 221 may identify or authenticate an electronic device 201 in the communication network using the subscriber identification module (e.g., a SIM card) 224. According to an embodiment, the cellular module 221 may perform at least some of the functions that the processor 210 may provide. According to an embodiment, the cellular module 221 may include a communication processor (CP).

Each of the Wi-Fi module 223, the Bluetooth module 225, the GNSS module 227, or the NFC module 228 may include, for example, a processor that processes data transmitted and received via a corresponding module. In some embodiments, at least some (two or more) of the cellular module 221, the Wi-Fi module 223, the Bluetooth module 225, the GNSS module 227, and the NFC module 228 may be included in a single Integrated Chip (IC) or IC package.

The RF module 229 may transmit/receive, for example, a communication signal (e.g., an RF signal). The RF module 229 may include, for example, a transceiver, a power amplifier module (PAM), a frequency filter, a low-noise amplifier (LNA), an antenna, or the like. According to another embodiment, at least one of the cellular module 221, the Wi-Fi module 223, the Bluetooth module 225, the GNSS module 227, and the NFC module 228 may transmit/receive an RF signal via a separate RF module.

The subscriber identification module 224 may include, for example, a card including a subscriber identification module and/or an embedded SIM, and may contain unique identification information (e.g., an integrated circuit card identifier (ICCID)) or subscriber information (e.g., an international mobile subscriber identity (IMSI)).

The memory 230 (e.g., the memory 130) may include, for example, an embedded memory 232 or an external memory 234. The embedded memory 232 may include at least one of, for example, a volatile memory (e.g., a dynamic random access memory (DRAM), a static RAM (SRAM), a synchronous dynamic RAM (SDRAM), and the like) and a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), a hard drive, or a solid-state drive (SSD).

According to an embodiment, the memory 230 may store all information used for setting a voice parameter of a voice signal.

According to an embodiment, the memory 230 may store a parameter setting table including audio parameters corresponding to the state of the electronic device 201.

The external memory 234 may further include a flash drive, for example, a compact flash (CF), a secure digital (SD), a micro secure digital (Micro-SD), a mini secure digital (Mini-SD), an eXtreme digital (xD), a multi-media card (MMC), a memory stick, or the like. The external memory 234 may be functionally or physically connected to the electronic device 201 via any of various interfaces.

The sensor module 240 may, for example, measure a physical quantity or detect the state of operation of the electronic device 201, and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a Red, Green, and Blue (RGB) sensor), a biometric sensor 240I, a temperature/humidity sensor 240J, an illumination sensor 240K, and an ultraviolet (UV) sensor 240M. Additionally or alternatively, the sensor module 240A may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments, the electronic device 201 may further include a processor, which is configured to control the sensor module 240, as a part of the processor 210 or separately from the processor 210, in order to control the sensor module 240, while the processor 210 is in a sleep state.

The input device 250 may include, for example, a touch panel 252, a (digital) pen sensor 254, a key 256, and an ultrasonic input device 258. According to an embodiment, the input device 250 may receive an input signal associated with an audio parameter of a voice signal, depending on the state of the electronic device 201.

The touch panel 252 may use, for example, at least one of a capacitive type, a resistive type, an infrared type, and an ultrasonic type. Furthermore, the touch panel 252 may further include a control circuit. The touch panel 252 may further include a tactile layer to provide a tactile reaction to a user.

The (digital) pen sensor 254 may include, for example, a recognition sheet which is part of a touch panel or is separated from a touch panel. The key 256 may include, for example, a physical button, an optical key, or a keypad. The ultrasonic input device 258 may detect ultrasonic waves, which are generated by an input tool, via a microphone (e.g., a microphone 288) to determine data corresponding to the detected ultrasonic waves.

The display 260 (e.g., the display 160) may include a panel 262, a hologram device 264, or a projector 266. The panel 262 may have a configuration that is the same as, or similar to, that of the display 160 illustrated in FIG. 1. The panel 262 may be implemented to be, for example, flexible, transparent, or wearable. The panel 262 and the touch panel 252 may be configured as a single module. The hologram device 264 may show a three-dimensional image in the air using light interference. The projector 266 may display an image by projecting light onto a screen. The screen may be located, for example, in the interior of, or on the exterior of, the electronic device 201. According to an embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-sub-miniature (D-sub) interface 278. The interface 270 may be included in, for example, the communication interface 170 illustrated in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

For example, the audio module 280 may execute bidirectional conversion between a sound and an electrical signal. At least some elements of the audio module 280 may be included, for example, in the input/output interface 150 illustrated in FIG. 1. The audio module 280 may process sound information that is input or output via, for example, a speaker 282, a receiver 284, earphones 286, the microphone 288, and the like.

According to an embodiment, the audio module 280 may set a voice signal's voice parameter that corresponds to the state of the electronic device 201, and may output a voice signal based on the set voice parameter to the communication module 220.

The camera module 291 is, for example, a device which may photograph a still image and a dynamic image. According to an embodiment, the camera module 291 may include one or more image sensors (e.g., a front sensor or a back sensor), a lens, an image signal processor (ISP), or a flash (e.g., an LED, a xenon lamp, or the like).

The power management module 295 may manage, for example, the power of the electronic device 201. According to an embodiment, the power management module 295 may include a power management integrated circuit (PMIC), a charger integrated circuit (IC), or a battery or fuel gauge. The PMIC may use a wired and/or wireless charging method. The wireless charging method may include, for example, a magnetic-resonance method, a magnetic-induction method, an electromagnetic-wave method, and the like. Additional circuits (e.g., a coil loop, a resonance circuit, a rectifier, and the like) for wireless charging may be further included. The battery gauge may measure, for example, the amount of charge remaining in the battery 296 and a voltage, current, or temperature while charging. The battery 296 may include, for example, a rechargeable battery and/or a solar battery.

The indicator 297 may display the particular state of the electronic device 201 or a part (e.g., the processor 210) of the electronic device 201, for example, a booting state, a message state, a charging state, or the like. The motor 298 may convert an electric signal into mechanical vibration, and may generate vibration, a haptic effect, or the like. Although not illustrated, the electronic device 201 may include a processing device (e.g., a GPU) for supporting mobile television (TV). The processing device for supporting mobile TV may process, for example, media data according to a certain standard such as Digital Multimedia Broadcasting (DMB), Digital Video Broadcasting (DVB), or mediaFLO™.

Each of the above-described component elements of hardware according to the present disclosure may be configured with one or more components, and the names of the corresponding component elements may vary based on the type of electronic device. In various embodiments, the electronic device may include at least one of the above-described elements. Some of the above-described elements may be omitted from the electronic device, or the electronic device may further include additional elements. Also, some of the hardware components according to various embodiments may be combined into one entity, which may perform functions identical to those of the relevant components before the combination.

Figure 3:
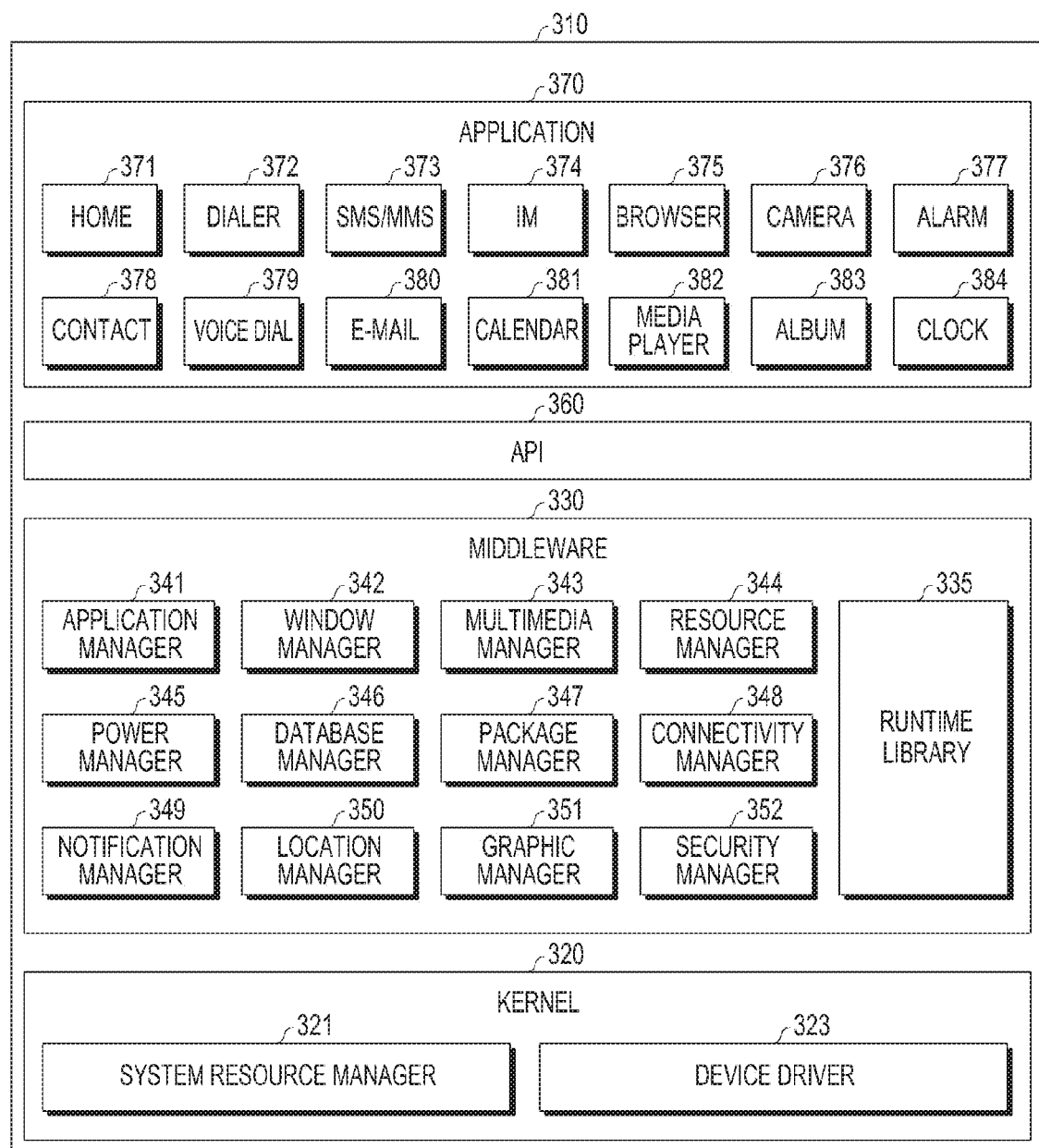
FIG. 3 is a block diagram of a program module according to various embodiments.

FIG. 3 is a block diagram of a program module according to various embodiments. According to an embodiment, the program module 310 (e.g., the program 140) may include an Operating System (OS) for controlling resources related to an electronic device (e.g., the electronic device 101) and/or various applications (e.g., the application program 147) executed in the operating system. The operating system may be, for example, Android, iOS, Windows, Symbian, Tizen, Bada, or the like.

The program module 310 may include a kernel 320, middleware 330, an Application Programming Interface (API) 360, and/or an application 370. At least some of the program module 310 may be preloaded on the electronic device, or may be downloaded from an external electronic device (e.g., the electronic device 102 or 104, the server 106, or the like).

The kernel 320 (e.g., the kernel 141) may include, for example, a system resource manager 321 and/or a device driver 323. The system resource manager 321 may control, assign, or retrieve system resources. According to an embodiment, the system resource manager 321 may include a process management unit, a memory management unit, a file system management unit, or the like. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

The middleware 330 may provide a function required by the applications 370 in common, or may provide various functions to the applications 370 via the API 360 so that the applications 370 may efficiently use the limited system resources within the electronic device. According to an embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function via a programming language while the applications 370 are being executed. The runtime library 335 may perform functions that are related to the management of input and output, the management of memory, arithmetic functions, and the like.

The application manager 341 may, for example, manage the life cycle of at least one of the applications 370. The window manager 342 may manage GUI resources used for a screen. The multimedia manager 343 may determine formats required for reproducing various media files, and may encode or decode a media file using a coder/decoder (codec) appropriate for the corresponding format. The resource manager 344 may manage resources, such as source code, memory, storage space, and the like, of at least one of the applications 370.

The power manager 345 may operate together with, for example, a basic input/output system (BIOS) to manage a battery or power, and may provide power information or the like required for the operation of the electronic device. The database manager 346 may generate, search for, or change a database to be used by at least one of the applications 370. The package manager 347 may manage the installation or update of an application that is distributed in the form of a package file.

The connectivity manager 348 may manage wireless connection of, for example, Wi-Fi or Bluetooth. The notification manager 349 may display or provide notification of an event, such as an arrival message, an appointment, a proximity notification, or the like, in such a manner as not to disturb a user. The location manager 350 may manage location information of the electronic device. The graphic manager 351 may manage graphic effects to be provided to a user and user interfaces related to the graphic effects. The security manager 352 may provide all security functions required for system security or user authentication. According to an embodiment, when the electronic device (e.g., the electronic device 101) has a telephone call function, the middleware 330 may further include a telephony manager that manages a voice or video call function of the electronic device.

The middleware 330 may include a middleware module including a combination of various functions of the aforementioned elements. The middleware 330 may provide a module specialized for each type of operating system in order to provide a differentiated function. Also, the middleware 330 may dynamically delete some existing elements, or may add new elements.

The API 360 (e.g., the API 145) is, for example, a set of API programming functions, and may be provided in different configurations for respective operating systems. For example, one API set may be provided for each platform in the case of Android or iOS, and two or more API sets may be provided for each platform in the case of Tizen.

The applications 370 (e.g., the application programs 147) may include one or more applications that may perform functions, for example, home 371, a dialer 372, SMS/MMS 373, instant messaging (IM) 374, a browser 375, a camera 376, an alarm 377, contacts 378, a voice dialer 379, e-mail 380, a calendar 381, a media player 382, an album 383, a clock 384, health care (e.g., measuring exercise quantity or blood sugar), and environment information provision (e.g., atmospheric pressure, humidity, temperature information, and the like).

According to an embodiment, the applications 370 may include an application (hereinafter, referred to as an "information exchange application" for convenience of description) that supports exchange of information between an electronic device (e.g., the electronic device 101) and an external electronic device (e.g., the electronic device 102 or 104). The information exchange application may include, for example, a notification relay application for transferring predetermined information to an external electronic device or a device management application for managing an external electronic device.

For example, the notification relay application may include a function of transferring, to an external electronic device (e.g., the electronic device 102 or 104), notification information that is generated from the other applications (e.g., the SMS/MMS application, the e-mail application, the health care application, the environmental information application, or the like) of an electronic device. Furthermore, the notification relay application, for example, may receive notification information from an external electronic device and may provide the received notification information to a user.

The device management application may manage (e.g., install, delete, or update), for example, at least one function of an external electronic device (e.g., the electronic device 102 or 104) that communicates with the electronic device (e.g., a function of turning on/off the external electronic device itself (or some elements thereof) or a function of adjusting the brightness (or resolution) of a display), applications that operate in the external electronic device, or services (e.g., a call service, a message service, or the like) that are provided by the external electronic device.

According to an embodiment, the applications 370 may include applications (e.g., a health care application of a mobile medical appliance, and the like) designated according to the attributes of an external electronic device (e.g., the electronic device 102 or 104). According to an embodiment, the applications 370 may include an application received from an external electronic device (e.g., the server 106 or the electronic device 102 or 104). According to an embodiment, the applications 370 may include a preloaded application or a third-party application that may be downloaded from a server. The names of the elements of the program module 310 according to the illustrated embodiment may be changed according to the type of operating system.

According to various embodiments, at least a part of the program module 310 may be implemented as software, firmware, hardware, or a combination of two or more thereof. At least a part of the program module 310 may be implemented (e.g., executed) by, for example, a processor (e.g., the processor 210). At least some of the program module 310 may include, for example, a module, a program, a routine, sets of instructions, a process, or the like for performing one or more functions.

Figure 4:
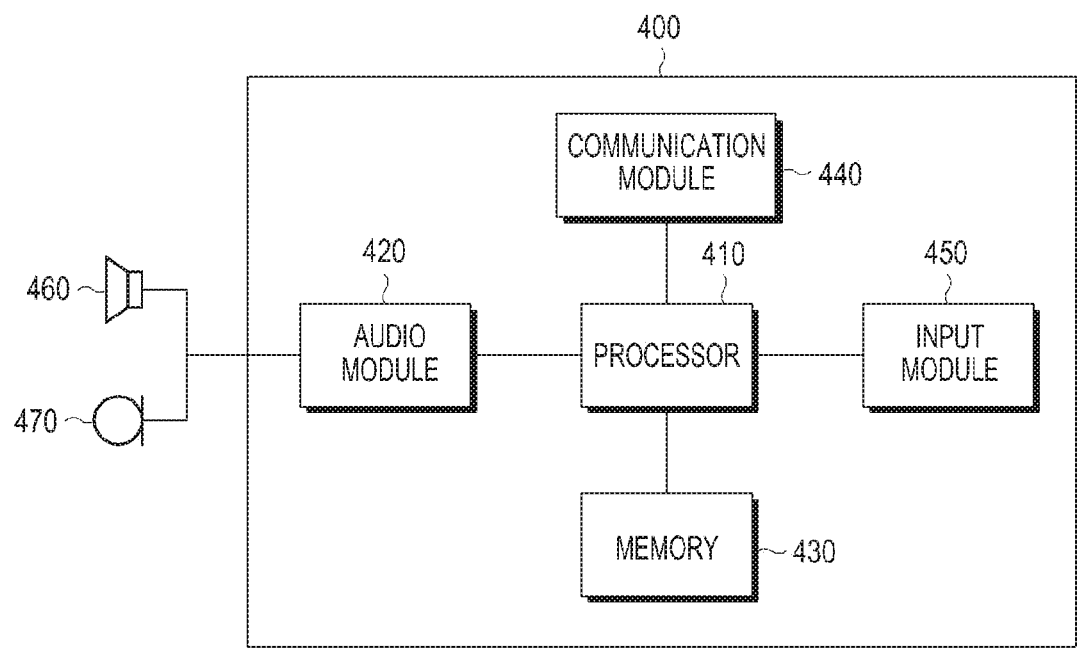
FIG. 4 is a diagram illustrating the configuration of an electronic device according to various embodiments.

FIG. 4 is a diagram illustrating the configuration of an electronic device according to various embodiments.

Referring to FIG. 4, an electronic device 400 may include, for example, a processor 410, an audio module 420, a memory 430, a communication module 440, an input module 450, a speaker 460, and a microphone 470.

The processor 410 may control the operation of the audio module 420, the memory 430, the communication module 440, the input module 450, the speaker 460, or the microphone 470.

According to an embodiment, when a voice signal is input from the microphone 470, the processor 410 may identify the state of the electronic device 400, may use the audio module 420 to filter the voice signal according to a first method when it is determined that the electronic device 400 is in a first state, and generate a first voice signal, and may use the audio module 420 to filter the voice signal according to a second method when it is determined that the electronic device 400 is in a second state, and generate a second sound signal. The processor 410 may transmit a corresponding voice signal from among the generated first voice signal and the generated second voice signal to an external electronic device (e.g., a reception terminal) via the communication module 440.

The first state may include the case in which the battery capacity of the electronic device 400 falls within a predetermined first range, and the second state may include the case in which the battery capacity of the electronic device 400 falls within a predetermined second range. The first state may include the normal mode of the electronic device 400, and the second state may include the power-saving mode of the electronic device 400.

According to an embodiment, the first method may include a first filtering method that filters a voice signal, based on at least one voice parameter according to the first state, and the second method may include a second filtering method that filters a voice signal, based on at least one voice parameter according to the second state.

The at least one voice parameter may include at least one selected from among the signal strength of the microphone 470, the frequency domain of a voice signal, volume, noise, echo, gain, dynamic range, and the like.

For example, according to the first filtering method, the processor 410 may adjust the signal strength of the microphone 470 to a first signal strength, may filter a voice signal to obtain a voice signal in a first frequency domain, may filter the voice signal and obtain a voice signal in a first time domain, may adjust the volume of the voice signal to a first volume, may adjust the noise level of the voice signal to a first noise level, may adjust the echo of the voice signal to a first echo level, may adjust the gain of the voice signal to a first gain, or may adjust the dynamic range of the voice signal to a first dynamic range.

For example, according to the second filtering method, the processor 410 may change the signal strength of the microphone 470 to a second signal strength, may filter a voice signal and obtain a voice signal in a second frequency domain, may filter the voice signal and obtain a voice signal in a second time domain, may adjust the volume of the voice signal to a second volume, may adjust the noise of the voice signal to a second noise level, may adjust the echo of the voice signal to a second echo level, may adjust the gain of the voice signal to a second gain, or may adjust the dynamic range of the voice signal to a second dynamic range.

According to an embodiment, the processor 410 may store, in the memory 430, a voice parameter table including at least one voice parameter based on the first state or the second state. The processor 410 may filter a voice signal, based on at least one voice parameter according to the first state or the second state, using the stored voice parameter table.

According to an embodiment, the processor 410 may provide a user interface by which at least one voice parameter value based on the first state or the second state is input via the input module 450, so as to filter a voice signal according to the first filtering method or the second filtering method. The processor 410 may filter a voice signal, based on at least one voice parameter value input via the provided user interface.

According to various embodiments, when an event for changing the state of the electronic device 400 occurs, the processor 410 may change the state of the electronic device 400 in response to the event, may control the audio module 420 so as to filter a voice signal based on the at least one voice parameter corresponding to the changed state of the electronic device 400, and may transmit the filtered voice signal to an external electronic device via the communication module 440.

The event for changing the state of the electronic device 400 may include the case in which the electronic device 400 is changed from the first state to the second state and the case in which the electronic device 400 is changed from the second state to the first state.

According to an embodiment, when the event for changing the state of the electronic device 400 occurs, the processor 410 may provide a user interface used for changing the state of the electronic device 400.

According to an embodiment, when the event for changing the state of the electronic device 400 occurs, the processor 410 may identify the state of the electronic device 400, and may change the state of the electronic device 400 from a first mode to a second mode when the identified state of the electronic device 400 is the first mode.

According to an embodiment, in order to filter a voice signal, the processor 410 may store, in the memory 430, a voice parameter table including at least one voice parameter corresponding to the state of the electronic device 400, and may filter a voice signal using the stored voice parameter table.

For example, the voice parameter table may include at least one voice parameter corresponding to a normal mode or a power-saving mode. The at least one voice parameter may include at least one selected from among a parameter for adjusting the signal strength of the microphone 470, a parameter for adjusting the volume of a voice signal, a parameter for adjusting the noise of a voice signal, a parameter for adjusting the echo level of a voice signal, a parameter for adjusting the gain of a voice signal, a parameter for adjusting the dynamic range of a voice signal, and the like.

For example, when the state of the electronic device 400 is the normal mode, the processor 410 may adjust the volume of a voice signal to a first volume and may adjust the noise of the voice signal to a first noise level using the voice parameter table.

For example, when the state of the electronic device 400 is the power-saving mode, the processor 410 may adjust the volume of a voice signal to a second volume, which is lower than the first volume, and may adjust the noise of the voice signal to a second noise level, which is lower than the first noise level, using the voice parameter table.

As another example, the voice parameter table may be listed as shown in Table 1 provided below.

TABLE 1

| | State | | | |
|---|---|---|---|---|
| | | Power-saving mode | | |
| Voice parameter | Normal mode | Volume adjustment | Noise reduction | Volume adjustment and noise reduction |
| Volume parameter value | Vn | Vn + αn | Vn + βn | Vn + αn + βn |

Vn denotes the voice parameter value of a voice signal in the normal mode. αn denotes variation in the volume adjustment parameter of a voice signal in the power-saving mode (e.g., AGC and volume level parameter). βn denotes variation in the noise reduction parameter of a voice signal in the power-saving mode.

Although the voice parameter table has been described using volume and noise reduction, the voice parameter table may further include at least one selected from among signal strength adjustment, echo cancellation, filtering, DRC, and the like.

The audio module 420 may filter and output a voice signal under the control of the processor 410.

The memory 430 may store information used for filtering a voice signal.

The communication module 440 may communicate with an external electronic device, and may transmit a generated first or second voice signal to the external electronic device.

The input module 450 may receive an input signal for adjusting a voice parameter for a voice signal.

The speaker 460 may output a voice signal.

The microphone 470 may receive a voice signal.

Figure 5:
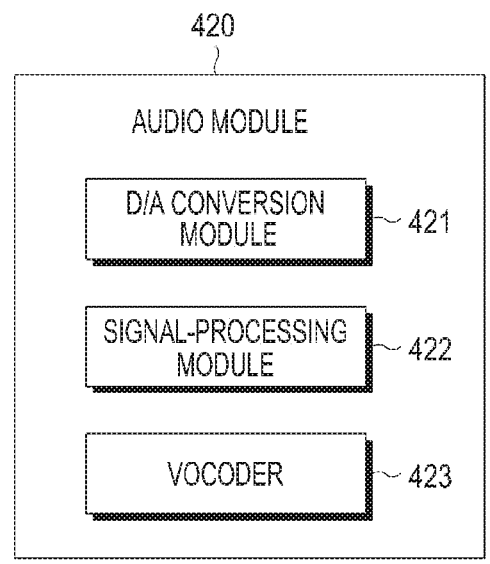
FIG. 5 is a diagram illustrating the configuration of an audio module according to various embodiments.

FIG. 5 is a diagram illustrating the configuration of an audio module according to various embodiments.

Referring to FIG. 5, the audio module 420 may include, for example, a digital-analog conversion module 421, a signal-processing module 422, and a vocoder 423.

The D/A conversion module 421 may convert an analog signal input via a microphone into a digital pulse code modulation (PCM) signal, or may convert a digital PCM signal into an analog signal for output.

The signal-processing module 422 may filter a voice signal according to a signal-processing method determined based on whether the state of the electronic device 400 is the normal mode or the power-saving mode.

According to an embodiment, the signal-processing module 422 may filter a voice signal according to a first method corresponding to the normal mode when the state of the electronic device 400 is the normal mode, and may filter a voice signal according to a second method corresponding to the power-saving mode when the state of the electronic device 400 is the power-saving mode.

According to another embodiment, the signal-processing module 422 may filter a voice signal, based on at least one voice parameter corresponding to the normal mode when the state of the electronic device 400 is the normal mode, and may filter a voice signal, based on at least one voice parameter corresponding to the power-saving mode when the state of the electronic device 400 is the power-saving mode.

The vocoder 423 may encode a filtered voice signal, and may output the encoded voice signal, or may decode a voice signal input via the communication module 440 and may output the decoded voice signal.

To achieve what is described above, according to various embodiments, an electronic device may include a microphone and a processor, wherein the processor is configured to perform: obtaining a voice signal via the microphone; identifying the state of the electronic device; filtering the voice signal according to a first method based at least on a determination indicating that the electronic device is in a first state, and generate a first voice signal; filtering the voice signal according to a second method based at least on a determination indicating that the electronic device is in a second state, and generate a second voice signal; and transmitting a corresponding voice signal from among the first voice signal and the second voice signal to an external electronic device.

To achieve what is described above, according to various embodiments, the state may include battery capacity information associated with the electronic device, and the processor may be configured to perform: generating the first voice signal when the battery capacity information falls within a first range; and generating the second voice signal when the battery capacity information falls within a second range To achieve what is described above, according to various embodiments, the processor may be configured to filter the voice signal and obtain a voice signal in a first frequency domain or a first time domain, according to at least a part of the first method.

To achieve what is described above, according to various embodiments, the processor may be configured to filter the voice signal and obtain a voice signal in a second frequency domain or a second time domain, according to at least a part of the second method.

To achieve what is described above, according to various embodiments, the processor may be configured to further adjust a gain of the voice signal, based at least on the determination indicating that the electronic device is in the first state.

To achieve what is described above, according to various embodiments, the processor may be configured to: adjust the gain of the voice signal according to a third method, based at least on the determination indicating that the electronic device is in the first state; and adjust the gain of the voice signal according to a fourth method, based at least on the determination indicating that the electronic device is in the second state.

To achieve what is described above, according to various embodiments, the processor may be configured to filter the voice signal, based on a voice parameter corresponding to the first state.

To achieve what is described above, according to various embodiments, the processor may be configured to filter the voice signal, based on a voice parameter corresponding to the second state.

To achieve what is described above, according to various embodiments, the processor may be configured to: change the state of the electronic device when an event for changing the state of the electronic device occurs; and filter the voice signal, based on a voice parameter corresponding to the changed state of the electronic device.

Figure 6:
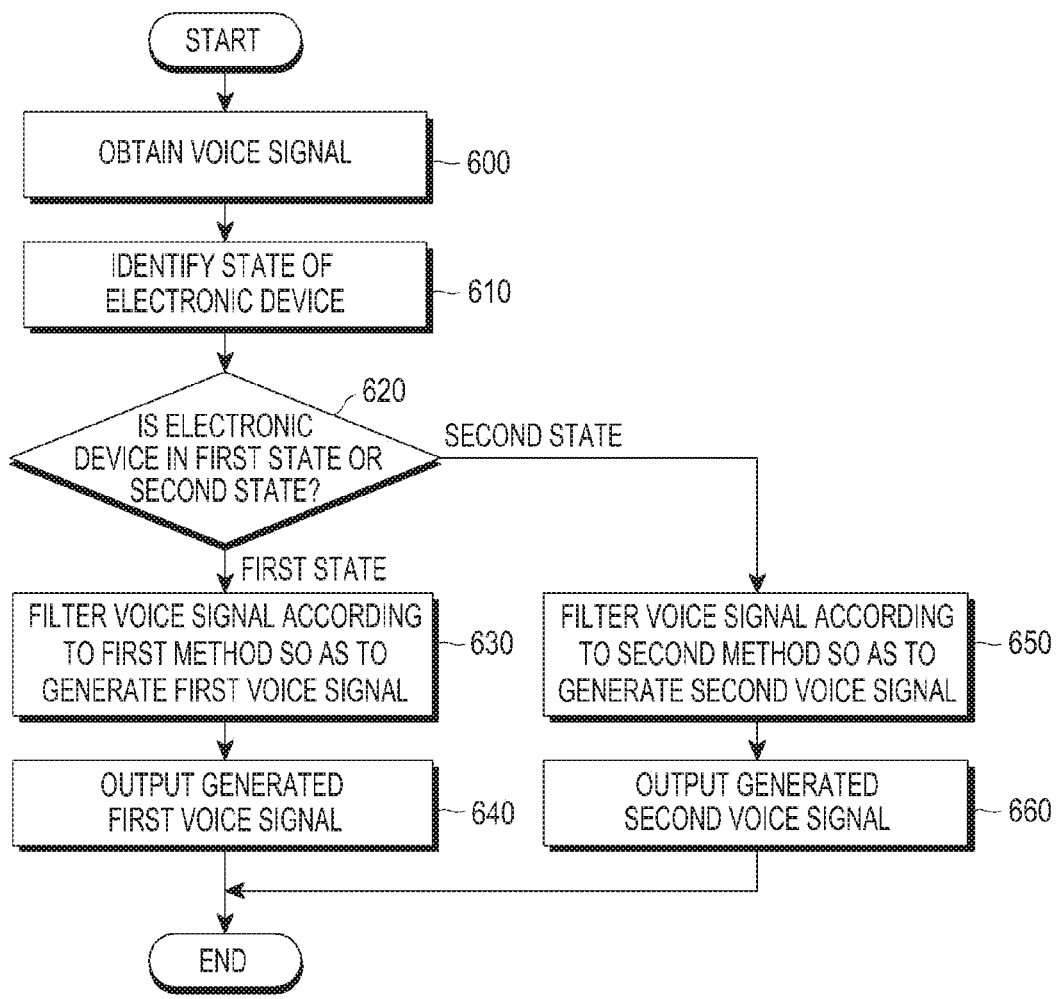
FIG. 6 is a flowchart illustrating a method of filtering a voice signal, based on the state of an electronic device according to various embodiments.

FIG. 6 is a flowchart illustrating a method of filtering a voice signal, based on the state of an electronic device, according to various embodiments. According to various embodiments, operations 600 to 660 may be executed via one of the electronic device 101, 104, 201, or 400, the server 106, the processor 120, 210, or 410, and the program module 280 or 420.

Referring to FIG. 6, in operation 600, the electronic device 400 may obtain a voice signal. For example, the electronic device 400 may receive a voice signal via the microphone 460.

In operation 610, the electronic device 400 may identify the state of the electronic device 400. According to an embodiment, the first state may include the normal mode of the electronic device 400, and the second state may include the power-saving mode of the electronic device 400.

In operation 620, the electronic device 400 may determine whether the identified state of the electronic device 400 is a first state or a second state, may perform operation 630 when the identified state of the electronic device 400 is the first state, and may perform operation 650 when the identified state of the electronic device 400 is the second state.

In operation 630, the electronic device 400 may filter a voice signal according to a first method and generate a first voice signal.

According to an embodiment, the electronic device 400 may filter a voice signal according to a first filtering method, corresponding to the first state of the electronic device 400, and may generate the first voice signal via the audio module 420.

In operation 640, the electronic device 400 may transmit the generated first voice signal to an external electronic device.

In operation 650, the electronic device 400 may filter a voice signal according to a second method and generate a second voice signal.

According to an embodiment, the electronic device 400 may filter a voice signal according to a second filtering method corresponding to the second state of the electronic device 400 and generate the second voice signal via the audio module 420.

In operation 660, the electronic device 400 may transmit the generated second voice signal to an external electronic device.

Figure 7:
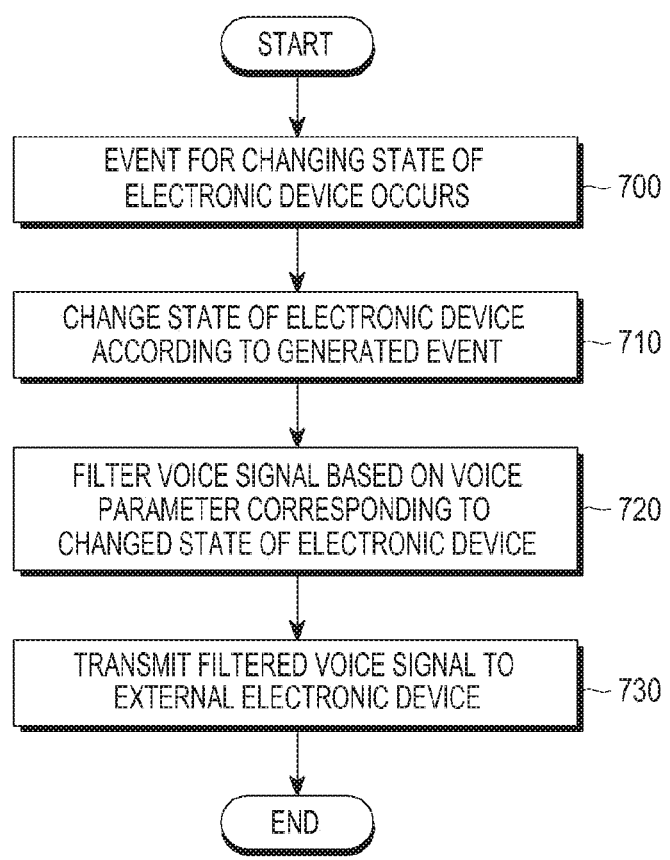
FIG. 7 is a flowchart illustrating a method of filtering a voice signal, based on a change in the state of an electronic device according to various embodiments.

FIG. 7 is a flowchart illustrating a method of filtering a voice signal, based on a change in the state of an electronic device according to various embodiments. According to various embodiments, operations 700 to 730 may be executed via one of the electronic device 101, 104, 201, or 400, the server 106, the processor 120, 210, or 410, and the audio module 280 or 420.

Referring to FIG. 7, when an event for changing the state of the electronic device 400 occurs in operation 700, the electronic device 400 may change the state of the electronic device 400 in response to the event in operation 710.

According to an embodiment, when an input for changing the state of the electronic device 400 is received from a user via the input module 450, the electronic device 400 may recognize the reception of the input as an event for changing the state of the electronic device 400.

In operation 710, the electronic device 400 may change the state of the electronic device 400.

According to an embodiment, in the case in which the state of the electronic device 400 is in the normal mode, when the input for changing the state is received, the electronic device 400 may change the state from the normal mode to the power-saving mode.

In operation 720, the electronic device 400 may filter a voice signal based on at least one voice parameter corresponding to the changed state of the electronic device 400. The at least one voice parameter may include at least one selected from among a parameter for adjusting the signal strength of the microphone 470, a parameter for adjusting the volume of a voice signal, a parameter for adjusting the noise of a voice signal, a parameter for adjusting the echo of a voice signal, a parameter for adjusting the gain of a voice signal, a parameter for adjusting the dynamic range of a voice signal, and the like.

For example, when the state of the electronic device 400 is changed from the normal mode to the power-saving mode, the electronic device 400 may filter a voice signal, based on a voice parameter corresponding to the power-saving mode.

In operation 730, the electronic device 400 may transmit the filtered voice signal to an external electronic device.

Figure 8:
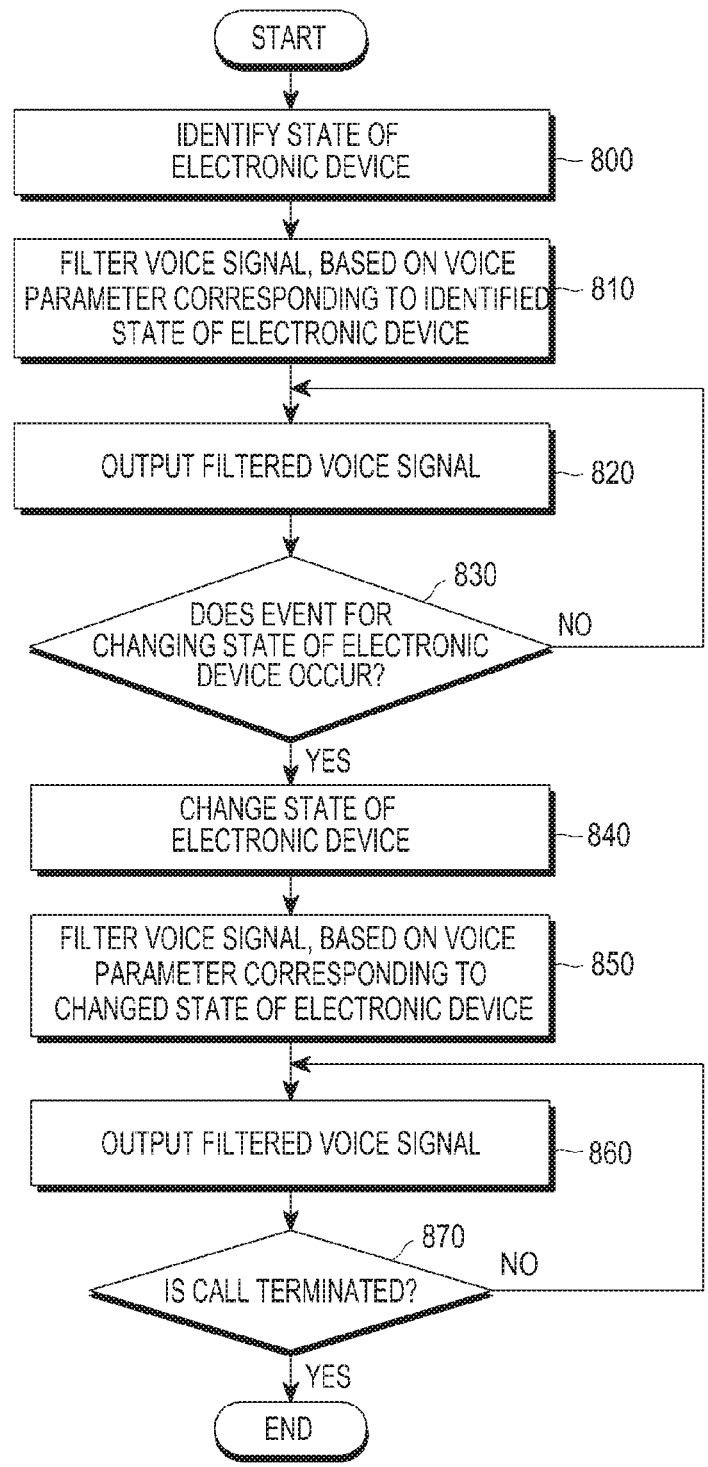
FIG. 8 is a flowchart illustrating a process of filtering a voice signal, based on a change in the state of an electronic device while a voice call is being performed according to various embodiments.

FIG. 8 is a flowchart illustrating a process of filtering a voice signal according to the state of the electronic device while a voice call is being performed according to various embodiments. According to various embodiments, operations 800 to 870 may be executed via one of the electronic device 101, 104, 201, or 400, the server 106, the processor 120, 210, or 410, and the audio module 280 or 420.

Referring to FIG. 8, when a call with an external electronic device begins, the electronic device 400 may identify the state of the electronic device 400 in operation 800. For example, the state of the electronic device 400 may be the normal mode or the power-saving mode.

In operation 810, the electronic device 400 may filter a voice signal, based on a voice parameter corresponding to the identified state of the electronic device 400.

According to an embodiment, when the identified state of the electronic device 400 is the normal mode, the electronic device 400 may filter a voice signal, based on a voice parameter corresponding to the normal mode.

For example, the electronic device 400 may identify a voice parameter corresponding to the normal mode, based on a voice parameter table, and may filter a voice call, based on the identified voice parameter.

For example, the electronic device 400 may provide a user interface used for inputting a voice parameter value corresponding to the normal mode, and may filter a voice signal, based on the voice parameter value input via the provided user interface.

In operation 820, the electronic device 400 may output the filtered voice signal.

In operation 830, the electronic device 400 identifies whether an event for changing the state of the electronic device 400 occurs, proceeds with operation 840 when the event for changing the state of the electronic device 400 occurs, and continuously outputs a voice signal filtered in operation 820 when the event for changing the state of the electronic device 400 does not occur.

According to an embodiment, the electronic device 400 may determine whether input for changing the state of the electronic device 400 is received via the input module 450.

In operation 840, the electronic device 400 may change the state of the electronic device 400.

According to an embodiment, when the input for changing the state of the electronic device 400 is received via the input module 450, the electronic device 400 may identify the state of the electronic device 400, and may change the state to the power-saving mode when the identified state is the normal mode.

In operation 850, the electronic device 400 may filter a voice signal, based on a voice parameter corresponding to the changed state.

According to an embodiment, the electronic device 400 may identify a voice parameter corresponding to the changed state of the electronic device 400, based on a voice parameter table stored in the memory 430, and may filter a voice signal, based on the identified voice parameter.

According to an embodiment, the electronic device 400 may provide a user interface used for inputting a voice parameter value corresponding to the changed state of the electronic device 400, and may filter a voice signal, based on the voice parameter value input via the provided user interface.

In operation 860, the electronic device 400 may output the filtered voice signal.

In operation 870, the electronic device 400 determines whether a call with an external electronic device is terminated, terminates a call operation when the call with the external electronic device is terminated, and continuously outputs a voice signal filtered in operation 860 when the call with the external electronic device is not terminated.

FIG. 9 is a flowchart illustrating a process of filtering a voice signal, based on a change in the state of an electronic device while a voice call is being performed according to various embodiments. According to various embodiments, operations 900 to 960 may be executed via one of the electronic device 101, 104, 201, or 400, the server 106, the processor 120, 210, or 410, and the audio module 280 or 420.

Referring to FIG. 9, when a call with an external electronic device begins, the electronic device 400 identifies whether the state of the electronic device 400 is the power-saving mode in operation 900, proceeds with operation 910 when the state of the electronic device 400 is the normal mode, and proceeds with operation 920 when the state of the electronic device 400 is the power-saving mode.

In operation 910, the electronic device 400 may filter a voice signal, based on a voice parameter corresponding to the normal mode.

In operation 920, the electronic device 400 may filter a voice signal, based on a voice parameter corresponding to the power-saving mode.

For example, when the state of the electronic device 400 is the power-saving mode, the electronic device 400 may filter a voice signal and obtain a voice signal with an enhanced NS and AGC, whereby low sounds, such as surrounding noise or the like, other than the voice, may be removed. As described above, in the case of surrounding noise, other than a voice signal, the vocoder 423 may not need to encode various signal information, such as pitch information or the like, but may encode a noise energy value, whereby the amount of power consumed for analyzing a voice signal may be reduced.

In operation 930, the electronic device 400 may output the filtered voice signal.

In operation 940, the electronic device 400 identifies whether an event for changing the state of the electronic device 400 occurs, proceeds with operation 950 when an event for changing the state of the electronic device 400 occurs, and proceeds with operation 960 when an event for changing the state of the electronic device 400 does not occur.

In operation 950, the electronic device 400 changes the state of the electronic device 400, proceeds with operation 900 so as to determine whether the state of the electronic device 400 is the power-saving mode, and performs operations 910 to 960. For example, when the state of the electronic device 400 is the normal mode, the electronic device 400 may change the state to the power-saving mode. When the state of the electronic device 400 is the power-saving mode, the electronic device 400 may change the state to the normal mode.

According to an embodiment, the electronic device 400 may identify a voice parameter corresponding to the changed state of the electronic device 400, based on a voice parameter table stored in the memory 430, and may filter a voice signal, based on the identified voice parameter.

According to an embodiment, the electronic device 400 may provide a user interface used for inputting a voice parameter value corresponding to the state of the electronic device 400, and may filter a voice signal, based on the voice parameter value input via the provided user interface.

In operation 960, the external electronic device 400 determines whether a call with an external electronic device has been terminated, terminates a call operation when the call with the external electronic device has been terminated, and continuously outputs a voice signal filtered in operation 930 when the call with the external electronic device has not been terminated.

To achieve what is described above, according to various embodiments, a method of filtering a voice signal by an electronic device may include: obtaining a voice signal via a microphone; identifying the state of the electronic device;

filtering the voice signal according to a first method based at least on a determination indicating that the electronic device is in a first state, and generate a first voice signal; filtering the voice signal according to a second method based at least on a determination indicating that the electronic device is in a second state, and generate a second voice signal; and transmitting, to an external electronic device, a corresponding voice signal from among the first voice signal and the second voice signal.

To achieve what is described above, according to various embodiments, the state includes battery capacity information associated with the electronic device.

To achieve what is described above, according to various embodiments, the operation of generating the first voice signal may include generating the first voice signal when the battery capacity information falls within a first range, and the operation of generating the second voice signal may include generating the second voice signal when the battery capacity information falls within a second range.

To achieve what is described above, according to various embodiments, the operation of generating the first voice signal may include filtering the voice signal and obtain a voice signal in a first frequency domain or a first time domain, according to at least a part of the first method.

To achieve what is described above, according to various embodiments, the operation of generating the second voice signal may include filtering the voice signal and obtain a voice signal in a second frequency domain or a second time domain, according to at least a part of the second method.

To achieve what is described above, according to various embodiments, the operation of generating the first voice signal may include further adjusting a gain of the voice signal, based at least on a determination indicating that the electronic device is in a first state.

To achieve what is described above, according to various embodiments, the operation of generating the first voice signal may include: adjusting the gain of the voice signal according to a third method, based at least on a determination indicating that the electronic device is in the first state; and the operation of generating the second voice signal may include: adjusting the gain of the voice signal according to a fourth method, based at least on a determination indicating that the electronic device is in the second state.

To achieve what is described above, according to various embodiments, the operation of generating the first voice signal may include: filtering the voice signal, based on a voice parameter corresponding to the first state.

To achieve what is described above, according to various embodiments, the operation of generating the second voice signal may include filtering the voice signal, based on a voice parameter corresponding to the second state.

To achieve what is described above, according to various embodiments, the method may further include: changing the state of the electronic device when an event for changing the state of the electronic device occurs; and filtering the voice signal, based on a voice parameter corresponding to the changed state of the electronic device.

To achieve what is described above, according to various embodiments, the operation of changing the state of the electronic device may include changing the state from the first state to the second state or changing the state from the second state to the first state.

Figures 10A, 10B:
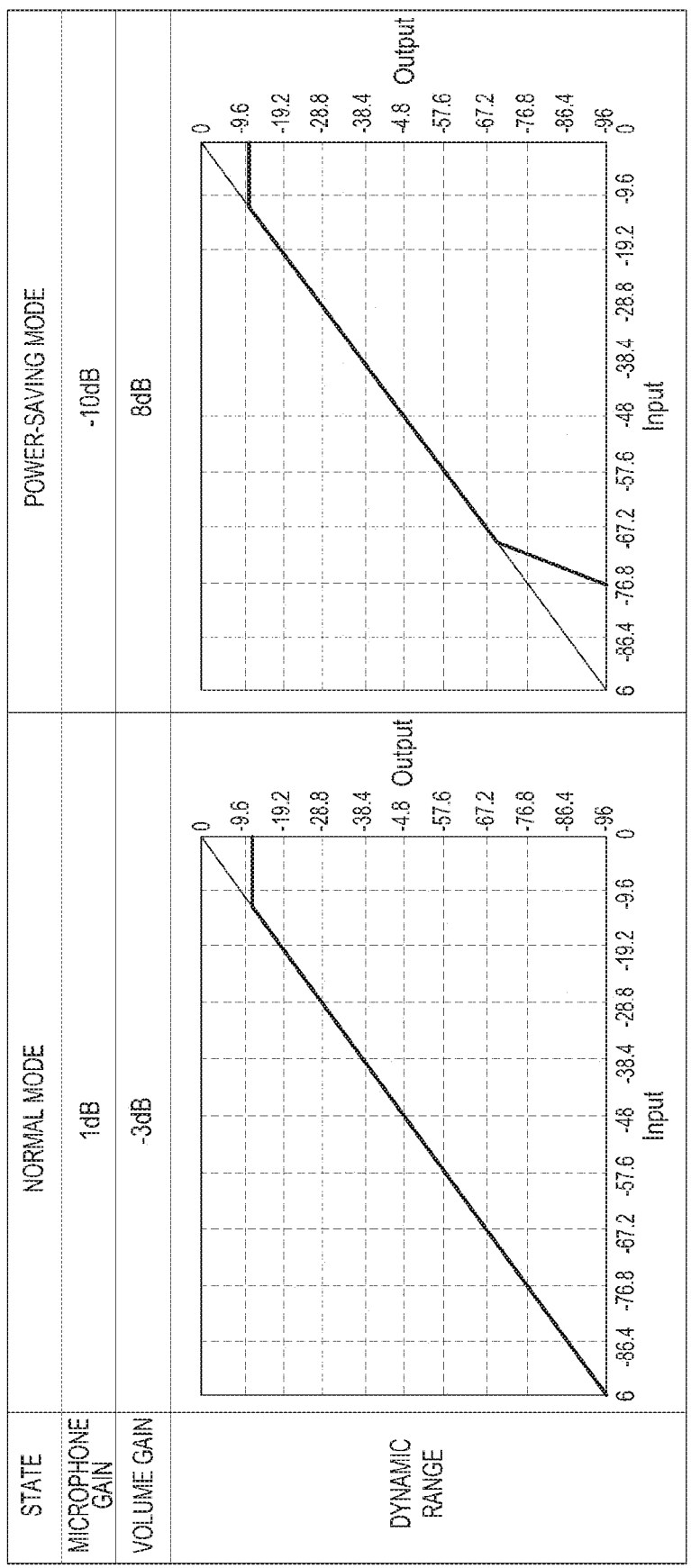
FIG. 10 is a diagram illustrating an example of filtering a voice signal, based on a voice parameter table according to various embodiments.

FIG. 10 is a diagram illustrating an example of filtering a voice signal, based on a voice parameter table according to various embodiments.

Referring to FIG. 10, in the normal mode, the electronic device 400 may adjust the microphone gain of a voice signal to 1 dB, may adjust the volume gain of the voice signal to −3 dB, and may adjust the dynamic range of the voice signal as shown in the diagram (a) of FIG. 10.

According to an embodiment, when the state of the electronic device 400 is changed from the normal mode to the power-saving mode, the electronic device 400 may adjust the microphone gain of a voice signal from 1 dB to −10 dB, may adjust the volume gain of a voice signal from −3 dB to 8 dB, and may perform adjustment to reduce the dynamic range of the voice signal, as shown in the diagram B of FIG. 10.

According to various embodiments, unnecessary signals distinguished from voice signals are removed by a transmission terminal, and the operation of a vocoder is minimized, whereby current consumption may be improved.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may, for example, be the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware electronic device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added. Various embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

The invention claimed is:

1. An electronic device, comprising:
a microphone; and
a processor, wherein the processor is configured to:
obtain a voice signal via the microphone,
identify a mode of the electronic device as one of a normal mode and a power saving mode,
in response to identifying the mode being the normal mode, filter the voice signal, based on a first parameter set to lower a level of a noise included in the voice signal to a first level,
in response to identifying the mode being the power saving mode, filter the voice signal, based on a second parameter set to lower the level of the noise to a second level lower than the first level, such that an amount of the voice signal which the processor encodes is less in the power saving mode than in the normal mode,
enclose the filtered voice signal; and
transmit the encoded voice signal to an external electronic device.

2. The electronic device of claim 1, wherein the processor is further configured to:
identify the mode of the electronic device, based on state includes battery capacity information associated with the electronic device,
set a parameter for filtering the voice signal based on the first parameter, when the battery capacity information falls within a first range; and
set the parameter to the second parameter when the battery capacity information falls within a second range.

3. The electronic device of claim 1, wherein the processor is configured to filter, based on the first parameter, the voice signal and obtain a voice signal in a first frequency domain or a first time domain.

4. The electronic device of claim 1, wherein the processor is configured to filter, based on the second parameter, the voice signal and obtain a voice signal in a second frequency domain or a second time domain.

5. The electronic device of claim 1, wherein, based on identifying the mode as being the power saving mode, the processor is further configured to adjust an auto gain control (AGC) of the voice signal, such that the amount of information which the processor encodes is less in the power saving mode than in the normal mode.

6. A method performed by an electronic device, the method comprising:
obtaining a voice signal via a microphone;
identifying a mode of the electronic device as one of a normal mode and a power saving mode;
in response to the mode being identified as the normal mode, filtering the voice signal, based on a first parameter set to lower a level of a noise included in the voice signal to a first level;
in response to the mode being identified as the power saving mode, filtering the voice signal, based on a second parameter set to lower the level of the noise to a second level lower than the first level, such that an amount of the voice signal which the processor encodes is less in the power saving mode than in the normal mode;
encoding the filtered voice signal; and
transmitting, to an external electronic device, the encoded voice signal.

7. The method of claim 6, wherein the mode of the electronic device is identified based on battery capacity information associated with the electronic device,
wherein a parameter for filtering the voice signal is set to the first parameter when the battery capacity information falls within a first range, and
wherein the parameter is set to the second parameter when the battery capacity information falls within a second range.

8. The method of claim 6, wherein filtering the voice signal, based on the first parameter comprises:
filtering the voice signal and obtain a voice signal in a first frequency domain or a first time domain.

9. The method of claim 6, wherein filtering the voice signal, based on the second parameter comprises:
filtering the voice signal and obtain a voice signal in a second frequency domain or a second time domain.

10. The method of claim 6, further comprising:
based on identifying the mode being the power saving mode, adjusting an auto gain control (AGC) of the voice signal, such that the amount of information which the processor encodes is less in the power saving mode than in the normal mode.

11. A storage medium storing instructions, wherein the instructions are configured to enable at least one processor to perform at least one operation when the instructions are executed by the at least one processor, the at least one operation comprising:
obtaining a voice signal via a microphone;
identifying a mode of an electronic device between a normal mode and a power saving mode;
based on identifying the mode being the normal mode, filtering, by the electronic device, the voice signal, based on a first parameter set to lower a level of a noise included in the voice signal to a first level;
based on identifying the mode being the power saving mode, filtering, by the electronic device, the voice signal, based on a second parameter set to lower the level of the noise level to a second level lower than the first level, such that an amount of the voice signal which the processor encodes is less in the power saving mode than in the normal mode;
encoding the filtered voice signal; and
transmitting, to an external electronic device, the encoded voice signal.

* * * * *